Oct. 11, 1932.   R. J. KENT   1,882,150
MANHOLE GUARD
Filed April 17, 1930   3 Sheets-Sheet 1

INVENTOR
R. J. Kent
BY
ATTORNEY

Oct. 11, 1932.     R. J. KENT     1,882,150
MANHOLE GUARD
Filed April 17, 1930    3 Sheets-Sheet 2

INVENTOR
R. J. Kent
BY
ATTORNEY

Oct. 11, 1932.  R. J. KENT  1,882,150
MANHOLE GUARD
Filed April 17, 1930    3 Sheets-Sheet 3

INVENTOR
R. J. Kent
BY
ATTORNEY

Patented Oct. 11, 1932

1,882,150

UNITED STATES PATENT OFFICE

ROBERT J. KENT, OF JAMAICA, NEW YORK, ASSIGNOR TO AMERICAN TELEPHONE AND TELEGRAPH COMPANY, A CORPORATION OF NEW YORK

MANHOLE GUARD

Application filed April 17, 1930. Serial No. 445,089.

This invention relates to manhole guards of an improved form, and more particularly to devices of this character which are adapted to be collapsed into a comparatively small form to require only a minimum amount of space for storage.

The novel features which are considered characteristic of this invention are set forth with particularity in the appended claims. The invention itself both as to its organization and method of operation, together with other objects and advantages thereof, will be further explained in the following detailed description having reference to the accompanying drawings consisting of the following figures.

Figure 1:
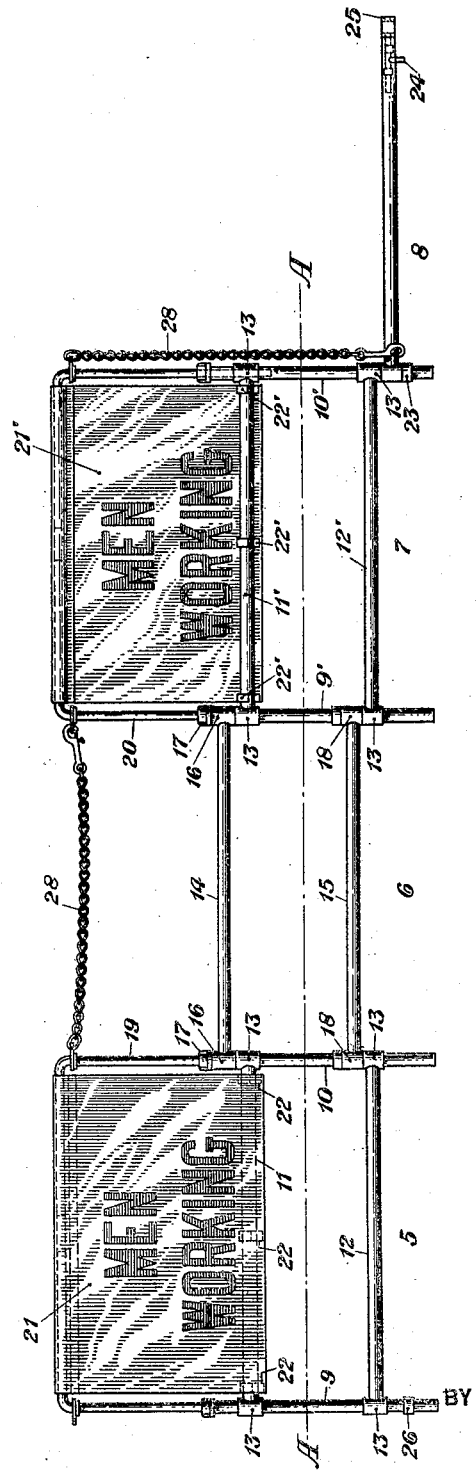
Figure 1 is an elevational view of the improved device showing its sections in extended position.

Referring to the drawings, the improved device is shown as comprising four sections 5, 6, 7 and 8 which are hingedly connected together. The material for the framework of these sections may be formed of pipe, tubular or other suitable material.

The sections 5 and 7 are provided with vertical members 9, 10 and 9', 10' and horizontal members 11, 12, and 11', 12', respectively. The vertical members 9, 10, and 9', 10' of the sections 5 and 7 are provided with reinforced joints 13. Horizontal members 11, 12, and 11', 12' are welded or otherwise suitably connected to the reinforced joints.

The section 6 interconnects the sections 5 and 7 by horizontal members 14 and 15. The ends of the horizontal members 14 terminate in tubular portions 16, 16 carried by the sections 5 and 7. These portions are hinged on the vertical members 10 and 9' of the sections 5 and 7 respectively, between the fixed joints 13 and collars 17. The horizontal member 15 is attached at its ends to the collars 18, 18, which are seated on the reinforced joints 13, 13 carried by the vertical members 10 and 9', of sections 5 and 7, respectively.

The sections 5 and 7 are provided with extensible portions comprising members 19 and 20, respectively. These members may be composed of tubular piping material formed into substantially inverted U-shape having vertical side portions interconnected by horizontal top portions. The vertical portions are telescopically mounted in the vertical members 9 and 10, and 9', 10' of the sections 5 and 7. The ends of the vertical portions may be upset to prevent the extensible members from becoming disengaged from the members in which they are mounted.

Panels 21 and 21' are respectively carried by the extensible members 19 and 20. These panels may be substantially rectangular in shape, and may be composed of suitable metal. The upper portions of the panels may be looped or otherwise hingedly connected to the horizontal portions of the extensible members, and suitable legends may be inscribed on the outer surfaces of the panels to serve as a warning to pedestrians and vehicle drivers. The lower portions of the panels 21 and 21' are provided with a series of hooked members 22 and 22' which engage the upper horizontal members 11 and 11' of the sections 5 and 7 to support the members 19 and 20, and the legend bearing panels 21 and 21' in extended position.

Figure 2:
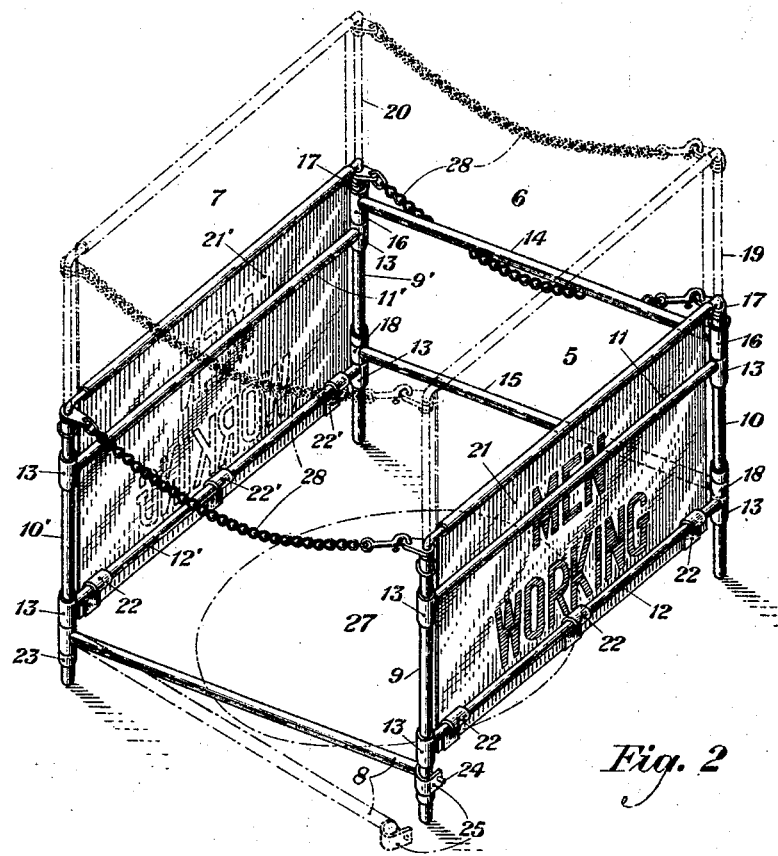
Fig. 2 is a perspective view showing the device in position about a manhole.
Figure 3:
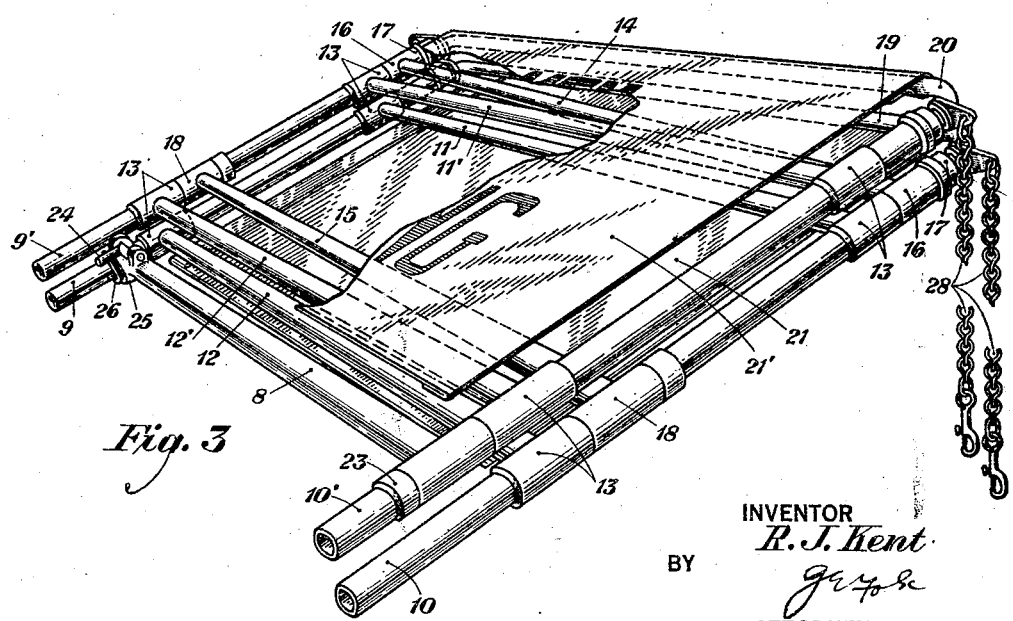
Fig. 3 is a perspective view showing the guard in collapsed position.

The section 8 of the improved device consists of a gate which is hinged between the fixed collars 13 and 23 positioned on the upright 10' of the section 7. This gate is shown as provided at its free end with a slidable bolt 24 and a hook portion 25. The hook is adapted to be positioned about the portion between the collars 13 and 26 on the upright 9 of section 5 when the guard is in the position shown in Fig. 2, and the extended end of the bolt 24 is adapted to register in an opening in said hook to couple the sections of the guard together to form an enclosure about a manhole 27. It will be understood that while a certain form of fastening is shown and described in connection with the gate, other suitable forms of fastening may be employed. Chains 28 may be secured to apertured lugs provided near the corners of the extensible members 19 and 20 to tie the sections together at their upper portions.

Where the manhole about which the improved guard is to be placed lies in a restricted space, for instance between tracks on which street cars travel in opposite directions, the formation of the guard may be changed from the rectangular formation indicated in Fig. 2 to a substantially diamond formation. When the guard is placed in the latter formation about the manhole lying between the pairs of tracks, the cars may pass each other at this point without interfering with said guard.

When it is desired to remove the guard from its set-up position about the manhole for the purpose of storing, or transporting it to another location, it is collapsed in the following manner. The chains are unhooked and the extensible members and their panels are raised sufficiently to release the hooks on the bottoms of the panels from their engagement with the upper horizontal members. The vertical legs of the extensible members are then lowered into the tubular uprights of their respective sections. When the lowering operation has been completed, the corners of the horizontal bars of the extensible members will rest on the tops of the uprights of their associated sections, and the hooks on the panels will engage the lower horizontal members. It will be noted, as more clearly indicated in Fig. 2 of the drawings, that the panels are positioned on the outside of the horizontal members of one section, and on the inside of the horizontal members of the other section. The free ends with the hooks of the panels will appear on the inside of the section in the first instance and on the outside of the section in the second instance.

Figure 4:
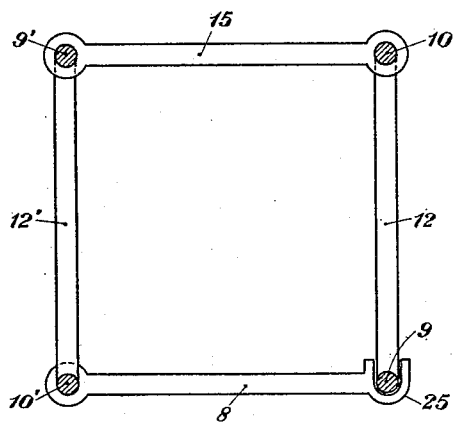
Figs. 4, 5, 6 and 7 are sectional views taken on the line A—A of Fig. 1, showing the various positions the elements assume in folding the guard to its collapsed formation.
Figure 6:
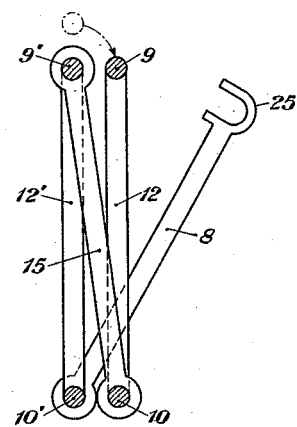
Figure 5:
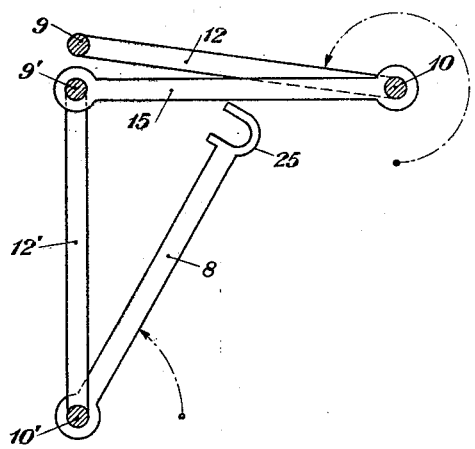
Figure 7:
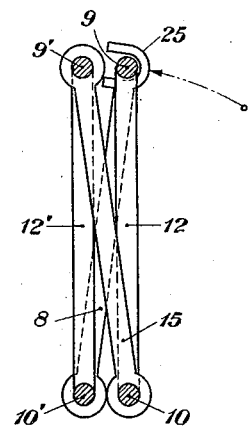

To show the various positions the elements assume in folding the guard to its collapsed position, reference may be had to Figs. 4 to 7, inclusive, in which the stages of the folding operation are sequentially depicted. In Fig. 4 the guard is shown in its normal set-up position. The first step taken to fold the guard after its extensible members are collapsed as above described, consists in unfastening the gate 8 from its engagement with the upright 9 of section 5. The section including the horizontal bar 12 is swung about the post 10 and pivoted and folded upon the section including the horizontal bar 15, as shown in Fig. 5. The gate 8 is also swung inwardly to some such position as indicated in Fig. 5. The now folded sections including the horizontal bars 15 and 12 are swung upon the post 9' as a pivot into the position shown in Fig. 6 so that the horizontal bars 12 and 12' now lie parallel to each other and above the gate 8. The gate 8 is then swung about the post 10' as a pivot and the hook 25 is engaged with the post 9 to lock the bars in collapsed relation, as shown in Fig. 7.

When the hook 25 is engaged with the post 9 as shown in Fig. 7, it is impossible to swing the post 10 outwardly away from the post 10', for in order to do this the post 9 must, in effect, rotate about the post 9' as a pivot, as will be seen more clearly from the arrow in Fig. 6. Since the post 9 cannot thus swing or rotate when engaged by the hook 25, it will be obvious that all the sections are locked together in their collapsed position. It should also be noted that before the sections including the members 12 and 15 are swung into the collapsed position shown in Fig. 6, the gate 8 must have previously been rotated into some such position as shown in Fig. 5. This is for the reason that if the post 10 is swung about the post 9' as a pivot to pass between the gate 8 and the member 12' of Fig. 5, the post 10 will then prevent the gate 8 from being swung about to engage the post 9. On the other hand, if the gate 8 is swung inwardly before the post 10 is brought down into juxtaposition with the post 10', so that the post 10 is in effect swung outside the gate 8, said gate may be then caused to engage the post 9 without interference with the post 10.

It should be noted that when the section including the bar 12 of Fig. 1 is swung about so that bar 12 underlies the bar 15 of Fig. 1 as shown in Fig. 5, the hooks 22 which rest upon the horizontal bar 12 when the panel 21 in its lowered position will be caught under the horizontal bar 15, thereby locking the panel 21 so that it cannot be elevated. Similarly, in Fig. 1 when the section including the horizontal bar 15, carrying with it the now folded bar 12 is swung around so that the bar 15 overlies the bar 12' as shown in Fig. 6, the hooks 22' which will rest upon the bar 12' when the panel 21' is in lowered position, will be caught under the bar 15 to prevent elevation of the panel 21'. Consequently, when the guard is in completely collapsed position with the hook 25 engaging the vertical post 9 as shown in Fig. 7, both panels 21 and 21' will be locked in their lowered positions.

The guard in its folded or collapsed position is of such compact formation that it may be readily inserted within a manhole and a cover placed thereon, and so stored overnight or longer as may be required. It will be apparent that the guard may be also readily transported in its collapsed position, and will require only a minimum amount of space.

When it is desired to set the guard up from its collapsed position, the gate is unlocked and the four sections are extended as previously described. The extensible members and their associated panels may be thus elevated.

What is claimed is:

1. A manhole guard comprising a plurality of rigid sections hingedly connected to each other, and legend bearing extensible members telescopically mounted in certain of said sections, and means for supporting said members in extended position above said sections.

2. A manhole guard comprising a plurality of hingedly connected sections, extensible members telescopically mounted in certain of said sections, and panels mounted on said extensible members for supporting said members in raised position upon said sections.

3. A manhole guard comprising a plurality of hingedly connected sections, extensible members telescopically mounted in certain of said sections, means mounted on said extensible members for supporting them in extended position above said sections, and a member pivoted to one section and engaging an adjacent section to connect the sections together to form an enclosure.

4. A manhole guard comprising a plurality of hingedly connected sections having horizontal portions, extensible members telescopically mounted in certain of said sections, and legend bearing panels associated with said extensible members and engaging said horizontal portions to support said extensible members in raised position above said sections.

5. A manhole guard comprising a plurality of hingedly connected sections having horizontal portions, extensible members telescopically mounted in certain of said sections, legend bearing panels associated with said extensible members and engaging said horizontal portions to support said extensible members in raised position above said sections, and a member pivoted to one section and engaging an adjacent section to connect the sections together to form an enclosure.

6. A manhole guard comprising a plurality of sections adapted to be connected to each other to form an enclosure, legend-bearing extensible members telescopically mounted in certain of said sections, means carried by said members and engaging said sections for supporting the members in raised position upon the sections, and hinged connections between the sections arranged to permit of folding said sections together in collapsed formation.

7. A manhole guard comprising three hinged sections, members slidably mounted in two of said sections and adapted to be extended from collapsed position in said sections, and a fourth section hinged to one of the sections and adapted to engage another section to form an enclosure, said fourth section being arranged to engage one of the sections when the slidable members of said two sections are in collapsed position to lock the sections together in such position.

8. A manhole guard comprising three hinged sections two of said sections being adapted to be collapsed, a gate member hinged to one of the sections and having means to engage another section to form with said hinged sections, a four-sided enclosure, the three sections being so hinged together that they may be folded upon each other in the collapsed position of said two sections, and said gate member being so related to the folded sections as to engage with one of the sections to lock the sections in collapsed position.

9. A manhole guard comprising three hinged sections, two of said sections adapted to be collapsed, a gate member hinged to one of the sections and having means to engage another section to form with said hinged sections a four-sided enclosure, the three sections being so hinged together that they may be folded upon each other in the collapsed position of said two sections, and said gate member being so related to said sections that it may be engaged with the same section with which it was engaged when the sections were opened up and when so engaged lock the sections in folded and collapsed relation.

10. A manhole guard comprising three hinged sections, two of said sections being adapted to be collapsed, a gate member hinged to one of the sections and having means to engage another section to form with said hinged sections a four-sided enclosure, said three sections being so hinged that the second section may be folded upon the section to which said gate member is hinged, and a third section folded upon said second section in a plane substantially parallel to the first section, said gate member being so related to said collapsed sections that it may be engaged with the third section to lock the guard in folded and collapsed position.

In testimony whereof, I have signed my name to this specification this 15th day of April, 1930.

ROBERT J. KENT.